March 7, 1950 F. F. GILBERT 2,499,487
AUTOMATIC WINDROWING DEVICE FOR HARVESTERS
Filed June 7, 1948 2 Sheets-Sheet 1

Fred F. Gilbert
INVENTOR.

BY *Clarence A. O'Brien*
*and Harvey B. Jacobson*
Attorneys

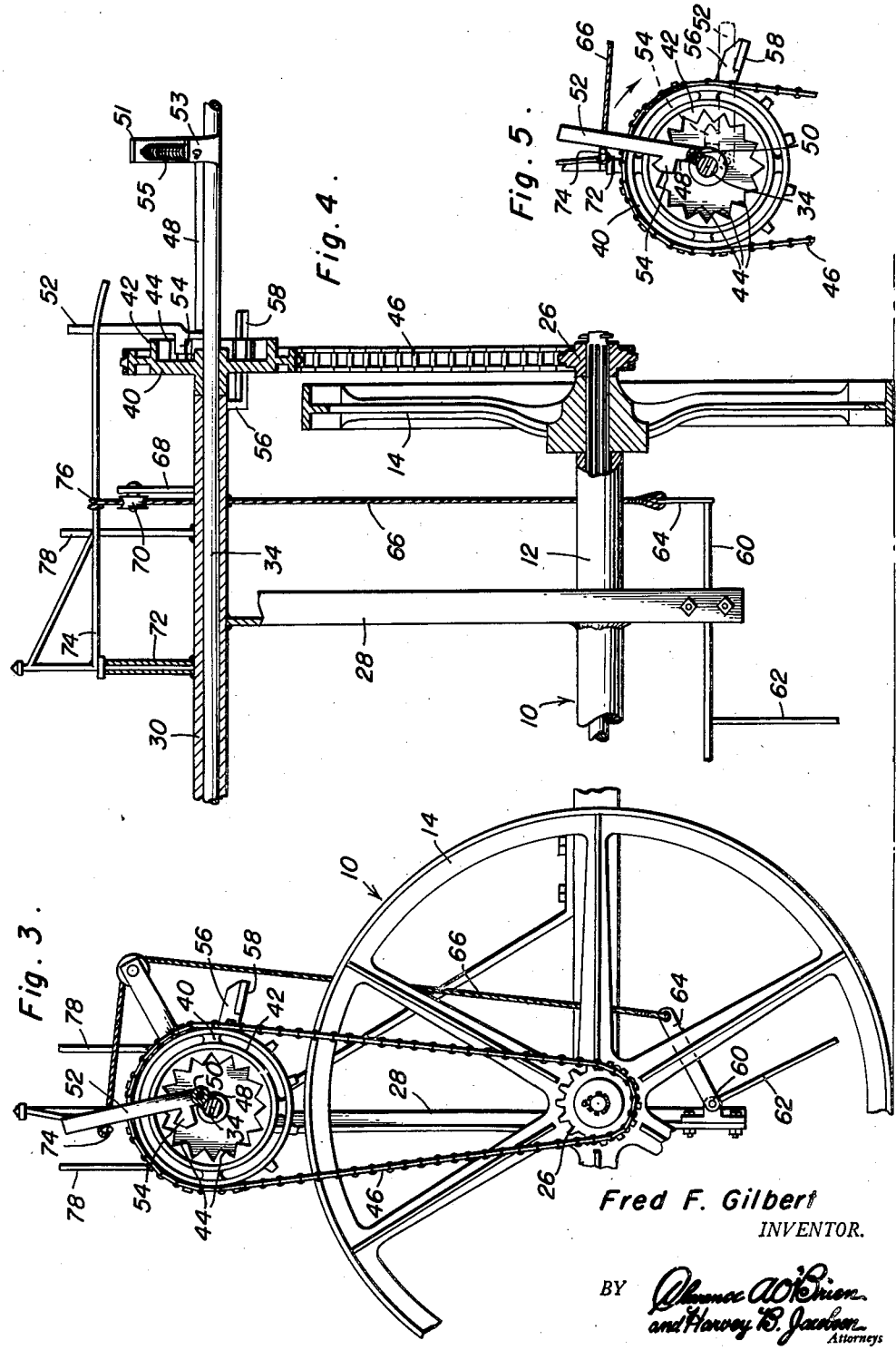

Patented Mar. 7, 1950

2,499,487

UNITED STATES PATENT OFFICE 2,499,487

AUTOMATIC WINDROWING DEVICE FOR HARVESTERS

Fred F. Gilbert, Draper, S. Dak.

Application June 7, 1948, Serial No. 31,439

2 Claims. (Cl. 56—192)

This invention relates to means automatically to dump or discharge the harvested products such as cut grain or the like as a harvester advances through a field.

Harvesters of the type to which the invention relates include a carriage, a sickle bar projecting laterally from the carriage, a gatherer to the rear of the sickle bar and a dropper movable above the rear end of the gatherer for discharging bunched harvested products from the gatherer such as is disclosed in Patent No. 1,867,168, granted to E. L. Neumeiscer et al., July 12, 1932, and Patent No. 626,471, granted to J. F. Wheeler, June 6, 1899.

The object of this invention is to arrange discharged bunches of harvested product in spaced substantially uniform windrows in the harvested connection between the clutch and the rock arm.

In the drawings:

Figure 3 is an enlarged fragmentary sectional view taken substantially along the line 3—3 of Figure 1;

Figure 4 is a fragmentary vertical sectional view taken substantially along the line 4—4 of Figure 2 on an enlarged scale;

Figure 5 is a fragmentary view of the clutch showing it tripped to rock the rock shaft.

Figure 1:
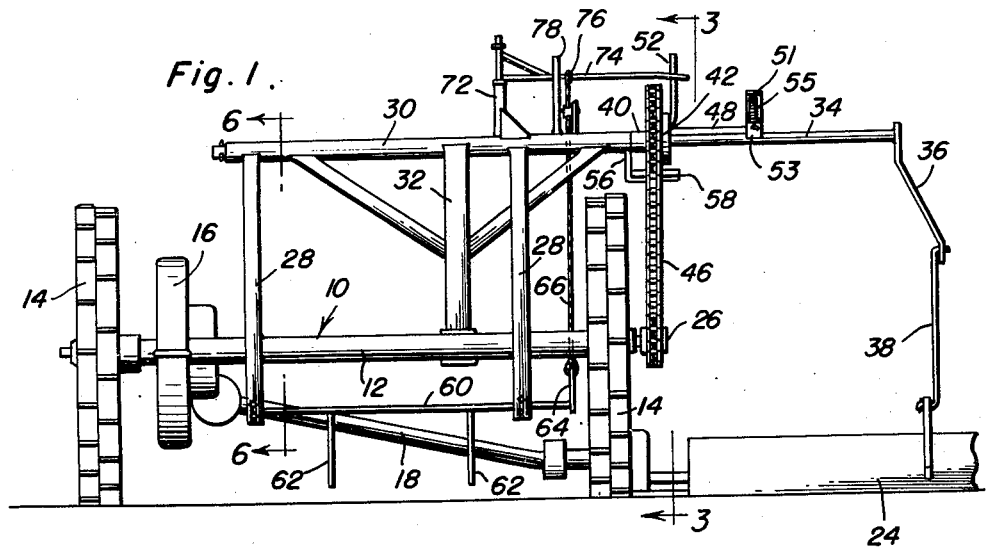
Figure 1 is a rear elevation of a harvester equipped with this improved windrowing device.
Figure 2:
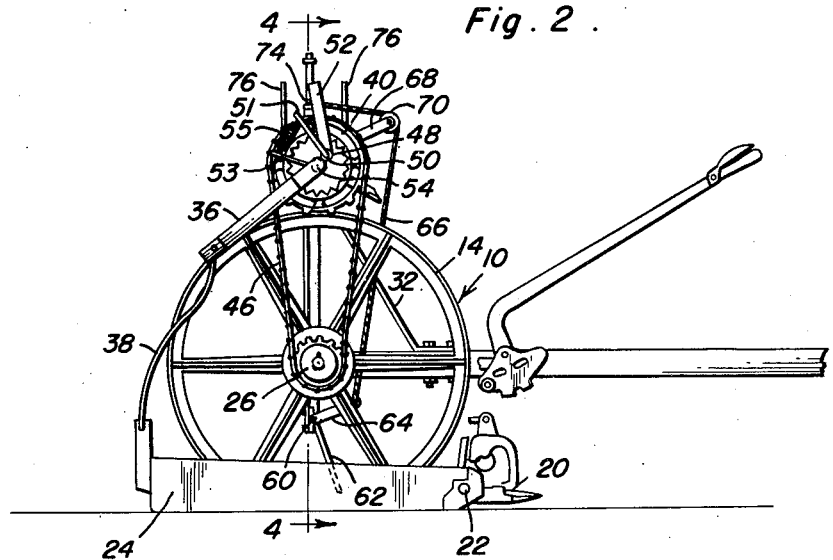
Figure 2 is a side view in elevation of the harvester illustrated in Figure 1.
Figure 6:
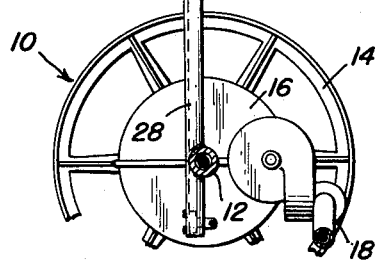
Figure 6 is an enlarged fragmentary sectional view taken substantially along the line 6—6 of Figure 1.

so that when the rock shaft 34 is rocked within the housing 30, the dropper 24 will be elevated and will swing upwardly through a vertical arc about the axis of the pivots 22. Mounted for rotation about the rock shaft 34 adjacent the end of the tubular housing 30 nearest the sprocket 26 is a sprocket 40 from one side of which projects a clutch member 42. As best illustrated in Figures 3 and 5 the clutch member 42 is provided with an internal annular row of spaced V-shaped notches forming inwardly projecting triangular teeth 44, the purpose of which will be more fully hereinafter described. An endless chain 46 establishes driving connection between the sprocket 26 and sprocket 40, so that as the harvester advances, the sprocket 40 and the clutch member 42 will be rotated.

Fixed to the rock shaft 34 adjacent the clutch member 42 is a tubular member 48 which lies parallel with the rock shaft and rotatably supported in the tubular member is a shaft 50 carrying at the end adjacent the clutch a lever arm 52 carrying a triangularly shaped dog 54 which when the lever arm is rocked about its pivot 50 engages in the V-shaped notches between the teeth 44 of the clutch member 42 and causes the shaft 34 to move in unison with the sprocket 40. An angular extension 51 extends radially from the opposite end of the shaft 50 and fixed to the rock shaft 34 adjacent the end of the tubular member 48 remote from the sprocket 40 is a radial arm 53. A retractile coil spring 55 is connected at one end to the extension 51 and at its opposite end to the arm 53 yieldingly to hold the dog 54 out of engagement with the teeth 44 of the clutch 42. Carried by the tubular housing 30 adjacent the sprocket 40 is a radial arm 56 carrying adjacent its free end a horizontally extending stop arm 58 which lies in the path of movement of the arm 52 so that as the dog 54 engaging the teeth 44 of the clutch 42 rotates the shaft 34 approximately one-half of a revolution, it will engage the stop arm 58 causing it to swing about its pivot 50 as suggested in the dotted lines in Figure 5 and withdraw the dog 54 from its position in a notch between the teeth 44, thus arresting further movement of the rock shaft 34, and permitting it to fall by gravity, i. e., under the influence of the weight of the dropper 24 back to its initial position as illustrated in Figure 3 while the spring 55 retains the latch dog 54 retracted. In this way the dropper is actuated to permit the bunch of harvested material collected on the gatherer to be discharged off of the rear end thereof.

In order to discharge the gatherer automatically, and deposit the bunched material in line with bunches previously deposited on the field, the trigger mechanism about to be described is employed.

Mounted for rocking movement in suitable brackets adjacent the lower ends of the standards 28 is a trigger shaft 60 which is provided at spaced intervals with depending trigger fingers 62 which are adapted to engage bunches deposited on the ground and cause the trigger shaft 60 to rock about an axis which lies parallel with the axle 12 and sickle bar 20. Fixed to one end of the trigger bar 60 is an arm 64 to the end of which remote from the trigger bar is coupled one end of a flexible cable 66. Extending radially from the tubular housing 30 is a bracket 68 carrying adjacent its free end a guide roller 70 over which the upper end of the flexible cable 66 is trained. A tubular column 72 rises from the tubular housing 30 and pivotally supported therein for movement through a horizontal arc is a trip arm 74 which as illustrated in Figures 1 and 4 intersects the path of movement of the lever arm 52, and coupled to the trip arm 74 intermediate its ends as at 75 is the end of the cable 66 remote from that which is coupled to the lever 64. It will thus be seen that as the trigger fingers 62 encounter a bunch of harvested product lying on the field, the trigger shaft 60 will rock the arm 64, thus exerting pull on the cable 66 and moving the trip 74 through a horizontal arc to cause the lever 52 to swing about its pivot 50 against the effort of the spring 55 and move the dog 54 into engagement with the teeth 44 of the clutch 40. Suitable parallel vertical stops 78 are carried by the tubular housing 30 to limit the horizontal swinging movement of the trip arm 74.

From the foregoing it will be obvious that as the harvester advances, and the trip fingers 62 engage a bunch of harvested material lying in a field, the clutch will be energized to cause the shaft 34 to rotate for approximately one-fourth of a revolution and lift the dropper 24 so as to permit the bunch of harvested material contained in the gatherer to be deposited in substantial alignment with the bunched material on the field. In this way a substantially uniform windrow is produced which will facilitate subsequent handling of the harvested product.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. In a harvester of the type which includes a carriage, a sickle bar projecting laterally from the carriage, a gatherer to the rear of the sickle bar and a dropper movable above the rear end of the gatherer for discharging bunched harvested product from the gatherer; means automatically to discharge bunched harvested product from the gatherer which includes a trigger mounted on the carriage to rock about an axis which lies parallel to the sickle bar when engaged by a bunch of harvested product lying in a field, a clutch rotatable about the rock shaft and driven by the advance of the harvester and means actuated by the trigger to establish driving connection between the clutch and the rock shaft.

2. In a harvester of the type which includes a carriage, a sickle bar projecting laterally from the carriage, a gatherer to the rear of the sickle bar and a dropper movable above the rear end of the gatherer for discharging bunched harvested product from the gatherer; means automatically to discharge bunched harvested product from the gatherer which includes a pair of standards carried by the harvester, a tubular housing fixed to the upper ends of the standards, said housing lying along an axis above and parallel to the sickle bar, a rock shaft mounted to rock in said tubular housing, a lever arm on the rock shaft, a link coupling the lever to the dropper to elevate the dropper when the rock shaft is rocked, a clutch mounted to rotate about the rock shaft, means coupled to the clutch for rotating it as the harvester advances, a trigger bar mounted adjacent the lower ends of the standards to rock about an axis which lies parallel to the tubular housing, trigger fingers depending from the trigger bar and adapted to rock the trigger bar when engaged by a bunch of harvested product lying in a field and means coupled to the trigger bar and to the clutch for establishing driving connection between the clutch and the rock arm.

FRED F. GILBERT.

REFERENCES CITED

The following references are of record in the file of this patent:

UNITED STATES PATENTS

| Number | Name | Date |
|---|---|---|
| 775,002 | Culp | Nov. 15, 1904 |
| 2,327,264 | Hendrickson | Aug. 17, 1943 |